US011173333B2

United States Patent
Kirila

(10) Patent No.: US 11,173,333 B2
(45) Date of Patent: Nov. 16, 2021

(54) FIRE CONTROL UTILIZING THERMAL IMAGING

(71) Applicant: Thomas Jerry Kirila, Brookfield, OH (US)

(72) Inventor: Thomas Jerry Kirila, Brookfield, OH (US)

(*) Notice: Subject to any disclaimer, the term of this patent is extended or adjusted under 35 U.S.C. 154(b) by 413 days.

(21) Appl. No.: 16/210,443

(22) Filed: Dec. 5, 2018

(65) Prior Publication Data

US 2019/0175970 A1 Jun. 13, 2019

Related U.S. Application Data

(60) Provisional application No. 62/596,410, filed on Dec. 8, 2017.

(51) Int. Cl.
*A62C 99/00* (2010.01)
*G09B 9/00* (2006.01)

(52) U.S. Cl.
CPC ............ *A62C 99/0081* (2013.01); *G09B 9/00* (2013.01)

(58) Field of Classification Search
CPC .... A62C 99/0081; A62C 99/00; G09B 19/00; G09B 9/00
See application file for complete search history.

(56) References Cited

U.S. PATENT DOCUMENTS

| 5,233,869 A * | 8/1993 | Rogers | A62C 99/0081 340/604 |
| 7,901,212 B2 * | 3/2011 | Quinn | A62C 99/0081 434/226 |
| 2018/0061269 A1 * | 3/2018 | Dutta | G09B 9/00 |

* cited by examiner

*Primary Examiner* — Timothy A Musselman
(74) *Attorney, Agent, or Firm* — Renner, Kenner, Greive, Bobek, Taylor & Weber Co., L.P.A.

(57) ABSTRACT

A firefighting training device and method for use in training firefighters in the extinguishment of a simulated fire. The system including a burn area disposed in a pit structure. The burn area including a multitude of individual burn zones such that each individual burn zones can support a fire there within. The system further including a control system to control the fire in each individual burn zone and a multitude of thermal imaging devices positioned to monitor the multitude of individual burn zones and to report the temperature of each individual burn zone to the control system.

9 Claims, 4 Drawing Sheets

FIRE CONTROL UTILIZING THERMAL IMAGING

CROSS-REFERENCE TO RELATED APPLICATION

This application claims the priority of provisional U.S. Application Ser. No. 62/596,410 filed on Dec. 8, 2017.

FIELD OF THE INVENTION

The invention herein resides in the art of training devices and systems for rescue, control, recovery, and management efforts in live fire situations. Particularly, the invention relates to a training device and system utilizing the controlled flow of flammable liquids or gas as a fire source within segmented and controllable fire burn zones. Specifically, the invention relates to the use of a thermal imaging system to view the fires within each fire burn zone and to control each burn zone so as to closely replicate the fire behavior of an actual live firefighting scenario.

BACKGROUND OF THE INVENTION

Fire training devices are widely used to train emergency personnel how to perform necessary tasks in an environment engulfed in flames. The state of the art has replicated buildings, vehicles, aircraft, industrial sites and the like that are subjected to controlled and regulated activation of live flames at selected locations in the replicated structure.

In general, the art has employed plumbed and wired training structures with fixed propane gas lines connected to burners in designated areas. The burners have been of a wide variety of types and are typically connected to an igniter, which has a pilot light flame engaging a thermocouple or the like to keep valved gas flow available to the burner so long as the thermocouple senses that the pilot light is lit. The burner itself, and particularly the pilot light igniter, operates in a harsh environment, necessarily exposed to high-pressure water or chemical spray, foam or the like. While the pilot light is typically shielded and baffled from the spray and foam, failures of the pilot light are not uncommon, and such failures tend to diminish the effectiveness of the training session with flames being prematurely or inadvertently extinguished.

Current practice is to control the independent ignition and intensity of each burn zone either with a manual interface, or a preprogrammed computer controlled sequence. However, the results are a less than realistic fire behavior. The intensity of each burn zone has typically been monitored with the use of a thermocouple which provides an output signal indicative of the sensed temperature to a control unit such as an automatic processing unit. However, due to the processing capability of individual thermocouple units, a large amount of thermocouple units are needed to attempt to properly gather the sensed temperature of each burn zone.

Accordingly, there is a need in the art for a fire training device and system that can provide a means to properly replicate the fire behavior of an actual live firefighting system in real time.

The foregoing and other aspects of the invention are attained by a system for the training of firefighters comprising (a) a burn area disposed in a pit structure; (b) a multitude of individual burn zones located within the burn area and wherein each individual burn zone can support a fire therewithin; (c) a control system to control the fire in each individual burn zone; and (d) a multitude of thermal imaging devices positioned to monitor the multitude of individual burn zones and to report temperatures within each individual burn zone to the control system.

Still further aspects of the invention are attained by a method of training firefighters, comprising the steps of (a) forming a system for the training of firefighters comprising a burn area disposed in a pit structure; a multitude of individual burn zones located within the burn area and wherein each individual burn zone can support a fire therewithin; a control system to control the fire in each individual burn zone; and a multitude of thermal imaging devices positioned to monitor the multitude of individual burn zones and to report the temperature of each individual burn zone to the control system; (b) directing the control system to start a fire within at least one of the multitude of individual burn zones; (c) allowing the firefighters to begin fighting the fire; and (d) monitoring the fire using the multitude of thermal imaging devices to determine, based on the temperature imaging of the fire, if the fire has been properly extinguished.

BRIEF DESCRIPTION OF THE DRAWINGS

For a complete understanding of the various aspects of the invention, reference should be made to the following detailed description and accompanying drawings wherein.

DETAILED DESCRIPTION OF ILLUSTRATIVE EMBODIMENTS

A firefighting training system utilizing thermal imaging devices to monitor the fire in real time is provided, as well as a method for controlling a firefighting training system utilizing thermal imaging devices.

Figure 1:
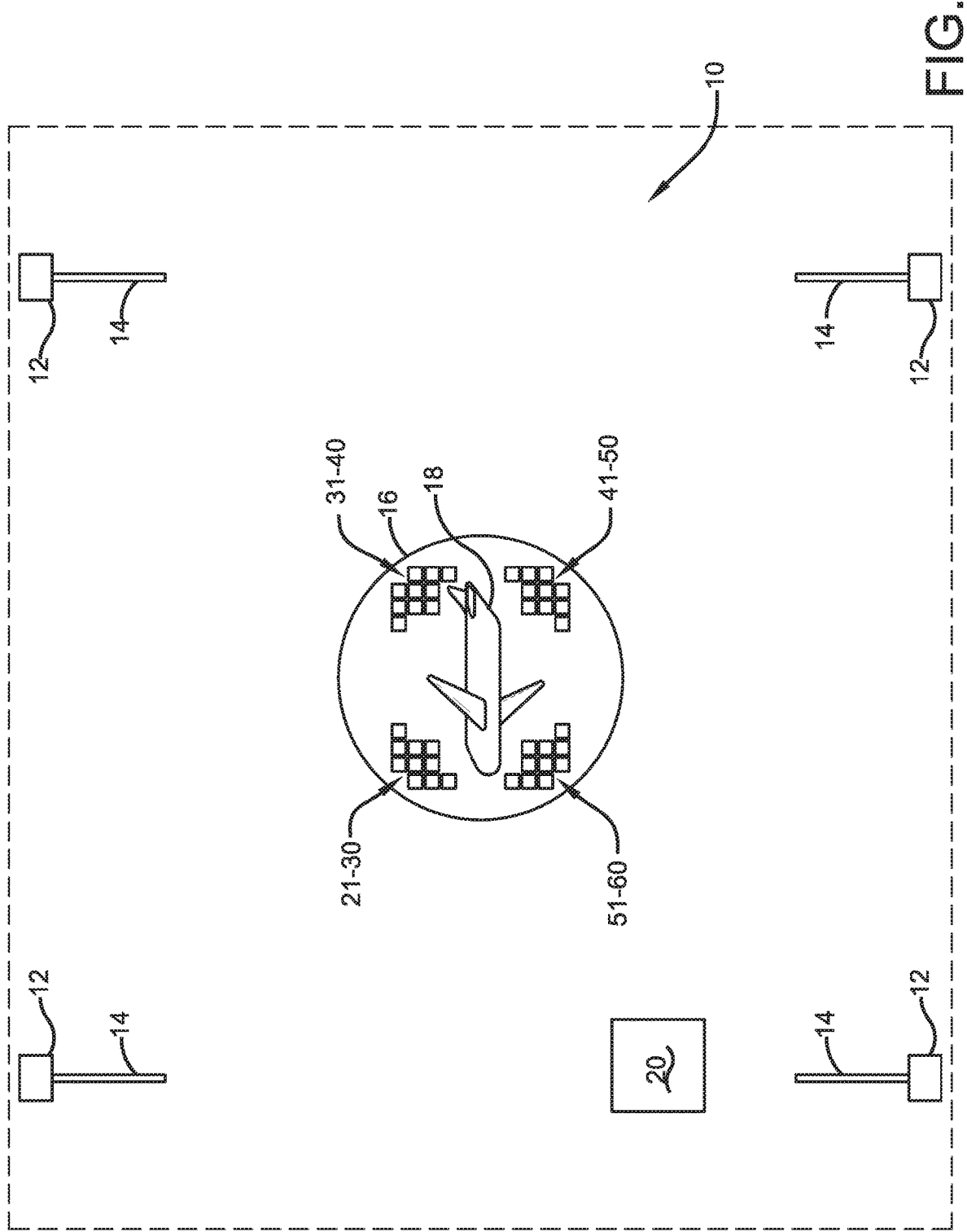
FIG. 1 is an overhead illustrative view of a firefighting training system employing thermal imaging devices according to the present invention.

FIG. 1 shows a firefighting training system 10 in accordance with an embodiment of the present invention. As shown in FIG. 1, system 10 includes multiple thermal imaging cameras or devices 12 mounted on utility poles 14. Although four thermal imaging devices 12 are shown in FIG. 1, the present invention also contemplates the use of less than four thermal imaging devices 12 or the use of more than four thermal imaging devices 12 because the present invention is not limited by the amount of thermal imaging cameras or devices 12 used.

System 10 further includes a burn pit 16 generally in the shape of a circle; however other shapes of burn pit 16 are contemplated by the present invention. FIG. 1 shows an aircraft 18 situated within burn pit 16 so as to simulate a fire produced by a downed aircraft. Although an aircraft 18 is shown in FIG. 1, system 10 can also be used to simulate other fire training scenarios, such as, but not limited to, a house fire, an industrial fire, and/or a chemical fire. As shown in FIG. 1, system 10 also includes a control building or area 20 which will be discussed below in further detail.

Figure 2:
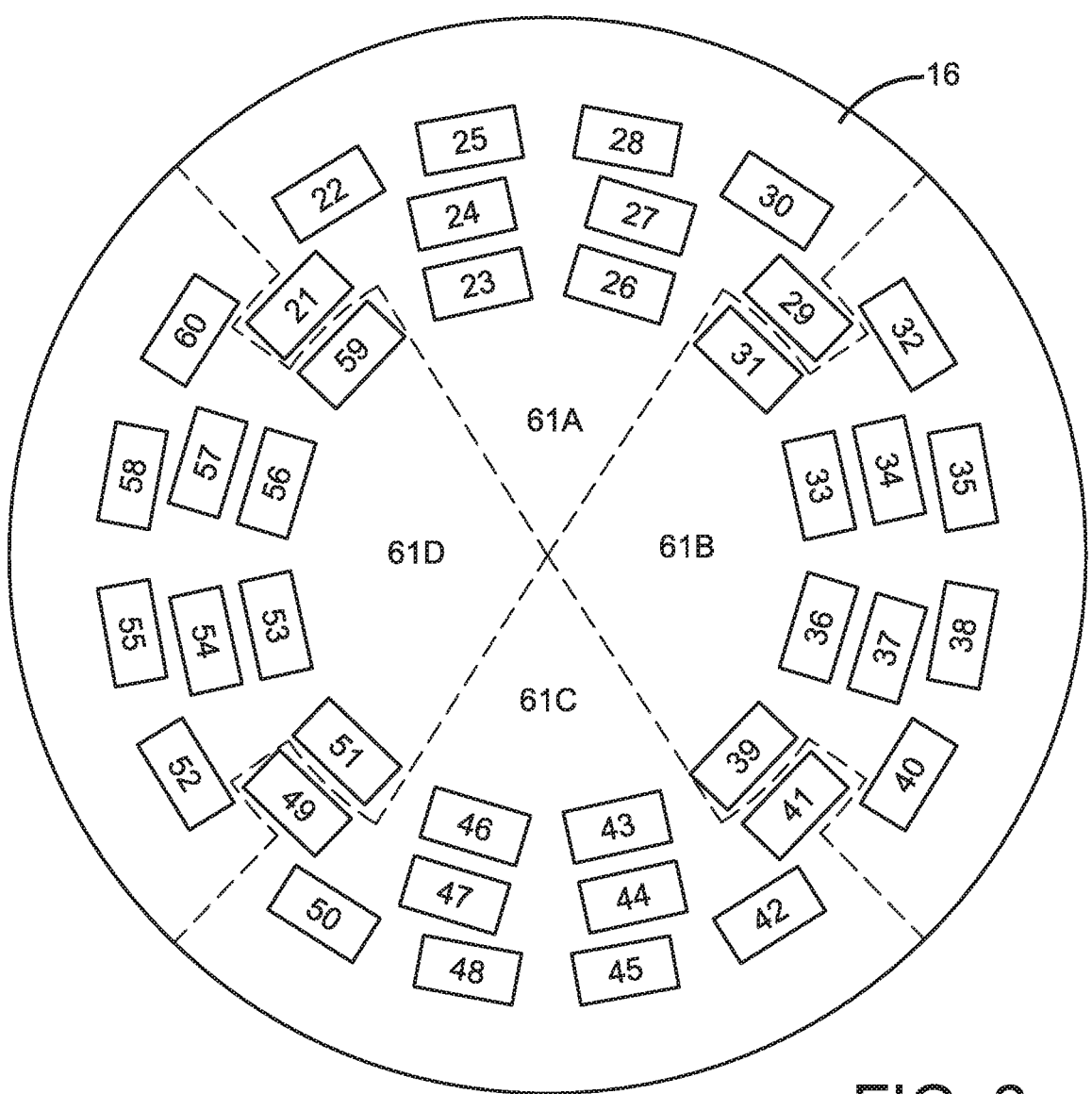
FIG. 2 is an illustrative view of a cluster of burn zones according to the present invention.

As shown in FIG. 1, and in more detail in FIG. 2, within burn pit 16 are individual burn zones 21 through 60. Although FIGS. 1 and 2 show a system 10 that utilizes forty individual burn zones, the present invention also contemplates the use of less than forty individual burn zones or the use of more than forty individual burn zones because the present invention is not limited by the amount of individual burn zones used. Aircraft 18 is not shown in FIG. 2 so as to get a more clear view of burn zones 21-60. In one or more embodiments, the height of each utility pole 14 and the distance of the thermal imaging devices 12 from the burn pit 16 will be optimized such that at least one of the thermal imaging devices will have a clear line of vision to each of the individual burn zones 21-60.

Burn zones 21-30 are located in manifold section 61A, burn zones 31-40 are located in manifold section 61B, burn zones 41-50 are located in manifold section 61C, and burn zones 51-60 are located in manifold section 61D.

Although not shown, the system 10 also includes a propane gas source which will use distribution piping to supply each of the burn zones 21-60 with a supply of liquid propane. In one or more embodiments, each manifold section 61A, 61B, 61C, and 61D may have its own propane gas source that only provides propane to the burn zones located within each respective manifold section.

Figure 3:
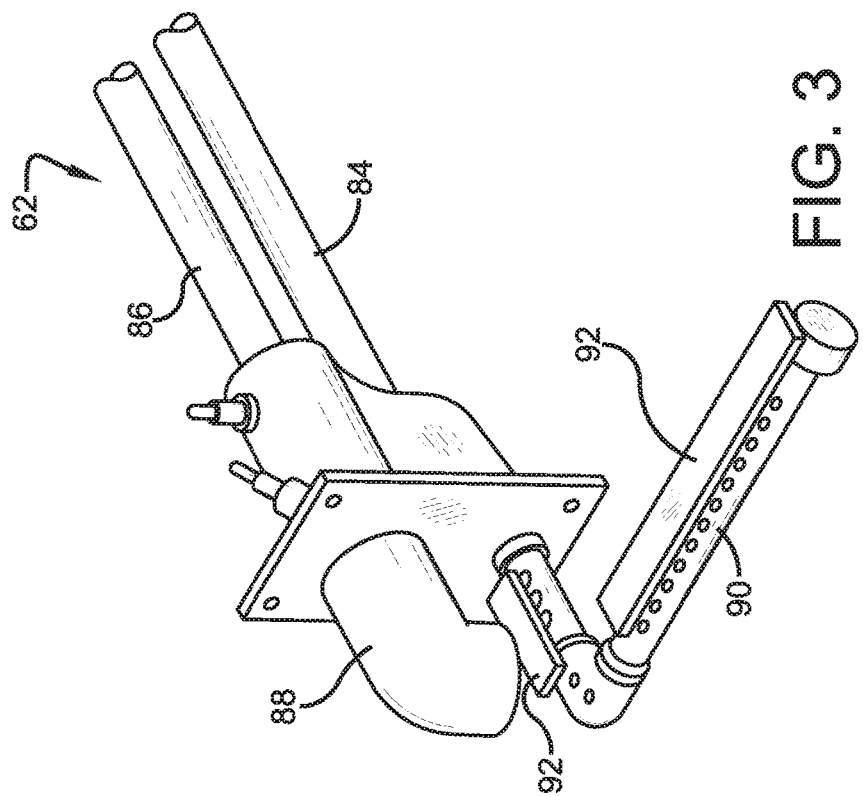
FIG. 3 is an enlarged perspective view of a burner contemplated by an embodiment of the present invention.

Each of the burn zones 21-60 will contain a burner 62, similar to the one shown in FIG. 3. Each burner 62 is designed to operate reliably under severe conditions such as being subject to the application of water and other extinguishing agents. Although not shown, each burner 62 will be coupled to a propane gas source such that if a valve associated with a specific burner 62 is opened, the propane gas source will provide propane to the specific burner 62 within a specific burn zone.

Figure 4:
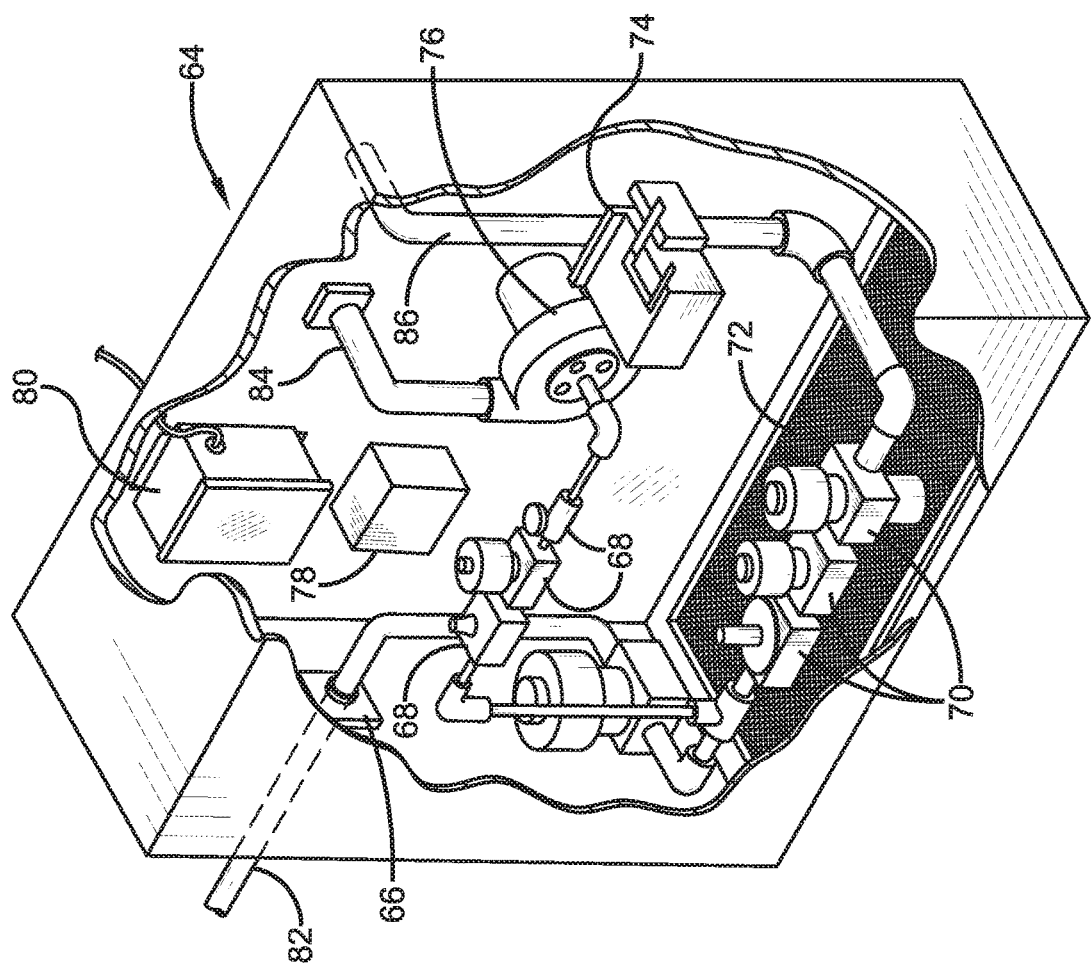
FIG. 4 is an enlarged perspective view of a burner control assembly contemplated by an embodiment of the present invention.

FIG. 3 shows an embodiment of a burner 62 and FIG. 4 shows an embodiment of a burner control assembly 64 contemplated by the present invention. In FIG. 3, burner 62 is shown. Each burn zone 21-60 contains a burner 62 that is identical in construction to burner 62 shown in FIG. 3. In FIG. 4, burner control assembly 64 is shown. Each of the burn zones 21-60 contains a burner control assembly 64 that is identical in construction to the burner control assembly 64 shown in FIG. 4. Burner control assembly 64 includes a supply gas inlet 66, pilot gas components 68, main gas components 70, an air inlet filter 72, and one or more motor controlled gas valves 74. Burner control assembly also includes a pilot blower 76, a flame safeguard unit 78, and an ignition transformer unit 80.

In FIG. 4, gas enters supply line 82. A solenoid operated shutoff valve located within line 82 controls the flow of gas to the pilot gas line 84 and to the main gas line 86. The pilot system includes components 68, blower 76 and pilot gas line 84 to deliver a proper mixture of propane and air to the burner head 88. The main gas system includes supply line 82, components 70, one or more gas flow control valves 74, and one or more main line 86 to deliver propane gas to one or more burner elements 90.

Burner head member 88 is mounted within each of the burn zones 21-60. The shape and configuration and materials of burner head 88 are such as to provide for reliable operation of pilot and main flames when subject to any of the various extinguishing agents.

Pilot gas components 68 include a pressure regulator, a manual shutoff valve, and a solenoid-operated pilot gas valve. Flame safeguard unit 78 is an automatic self-check unit. Main gas components 70 include a pressure regulator, a manual shutoff valve, and a solenoid-operated main gas valve.

In FIG. 3, burner element 90 contains drilled holes configured to satisfy a flame location. One or more elements may be utilized. The holes are about one-quarter inch in size and serve as gas nozzles. When main gas is introduced to element 90, it is ignited by the pilot and produces flame appearance as desired. Cover plates 92 prevent materials from falling into the holes in element 90.

In one or more embodiments of the present invention, the pilot gas components can be replaced with an electronic ignition system. An electronic ignition system uses a plurality of electrodes, each one being mounted adjacent each burner element 90 for producing sparks for the ignition of each burner element 90. A spark generating circuit will be connected with the electrodes in order to produce the sparks for igniting each burner element 90. Furthermore, a power source will be connected to the spark generating circuit in order to power the spark generating circuit.

Located within control building or area 20 is a Programmable Logic Controller (PLC) which controls the fire training system 10. The PLC utilizes the thermal imaging data collected by the multiple thermal imaging devices 12 to view the fires in real time. The thermal imaging data collected by the multiple thermal imaging devices 12 is interpreted by the PLC as various temperature matrixes within each of the burn zones 21-60. This temperature information is then used by the PLC with the purpose of controlling the distinct burn zones 21-60 to closely replicate the fire behavior of an actual live firefighting scenario.

Figure 5:
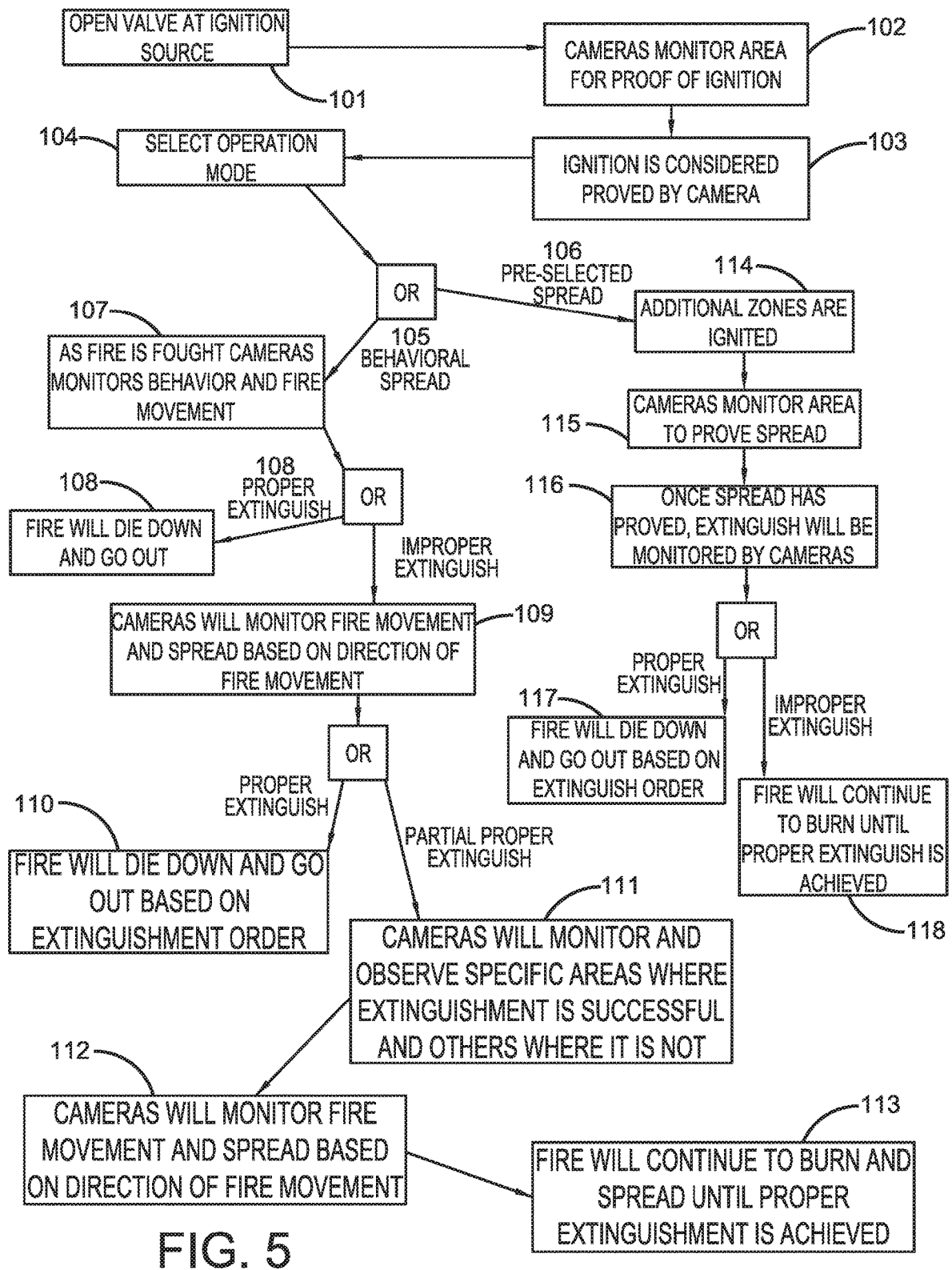
FIG. 5 is a flowchart demonstrating how, in one embodiment of the present invention, the firefighting training system according to the present invention would control the spread of a fire in response to temperature data collected by thermal imaging devices.

In one or more embodiments of the present invention, the PLC controls the fire training system 10 according to the decision matrix shown in the flowchart of FIG. 5. For example, a fire will be started at step 101 by the PLC opening a valve 74 to deliver propane gas to one or more burner elements 90 within, for example zones 21-25. Next, at step 102, the multiple thermal imaging devices 12 will monitor zones 21-25 to make sure that a fire has been started. If the multiple thermal imaging devices 12 have proven that a fire has been started, the PLC considers the fire proven at step 103.

Step 104 provides the operator of the fire training system 10 with an option. The operator of the fire training system 10 can either choose to have the fire training session operate with a behavioral spread, which will allow the fire training session to move forward with step 105, or, if the operator chooses to have the fire training session operate with a pre-selected spread, then the fire training session will move forward with step 106.

In one or more embodiments, a behavioral fire spread is defined as a fire pattern that is random and which is determined strictly based on how the trainees using the fire training system 10 to fight the fire. If the operator chooses to have the fire training session operate with a behavioral spread 105, then the next step in the process will be to have the multiple thermal imaging cameras or devices 12 continue to monitor the behavior of the fire at step 107. The PLC will be able to take the temperature information collected by the multiple thermal imaging devices 12 and will be able to determine if the trainees have done enough to the fire to properly extinguish the fire within the specific zone, and if the trainees have done enough, then the PLC continues to step 108 which will be the ending of the fire within that specific zone. In one or more embodiments, the fire is ended by valve 74 located within that specific zone being closed so as to stop the delivery of propane gas. However, if the PLC has determined that the trainees have not done enough to the fire to properly extinguish the fire within the specific zone, then the PLC will move to step 109, which is the continued monitoring of the fire in that specific zone, and potentially the spread of the fire to different zones.

In one or more embodiments, the PLC could spread the fire to a different zone in the following manner. The multiple thermal imaging devices 12 will gather thermal image interpretation data from, for example, zone 21. The data may show a large gradient from left to right across zone 21, which would be interpreted by the PLC as meaning that extinguishing media is being applied to the left side of zone 21. The PLC will then lower the fire intensity in zone 21, while at the same time igniting zone 22, which is adjacent to the right side of zone 21, if not already ignited, or increasing the fire intensity in zone 22 if already ignited. This effect of the fire being pushed towards the right based on extinguishing media being applied to the left side of a fire would duplicate the effect that extinguishing media would have on a fire in a real life scenario.

In one or more embodiments, the PLC could adjust the intensity of the fire within different zones based on how the trainees using the fire training system 10 fight the fire. For example, a training fire which replicates a fuel spill could be initiated according to the process described above such that the fire is contained within manifold section 61A which includes burn zones 21-30. The multiple thermal imaging devices 12 will gather thermal image interpretation data from zones 21-30. The data may indicate a cooling trend in the center of the cluster of zones located in manifold section 61A, which would be interpreted by the PLC as meaning that extinguishing media is being applied at the center of the cluster of zones. With this data, the PLC could then increase the intensity in the zones located on the perimeter of manifold section 61A, while decreasing the flame intensity in the center of the cluster so as to duplicate the effect that extinguishing media would have on a fuel spill fire in a real life scenario. In one or more embodiments, the PLC would be able to decrease the flame intensity by decreasing the amount of propane gas being delivered to those respective zones while at the same time being able to increase the flame intensity by increasing the amount of propane gas being delivered to those respective zones.

If the PLC moves to step 109, which is the continued monitoring of the fire in that specific zone, based on the improper extinguishment of a fire, then the next step in the process would be either step 110 or step 111. Step 110 is similar to step 108 inasmuch as if the trainees have done enough to extinguish the fire, then the PLC will end the fire within that specific zone based on the order in which the trainees decide to extinguish the fire. Step 111 would be taken if the PLC has determined that the trainees still have not done enough to the fire to properly extinguish the fire within the specific zone. Step 111 includes the continued monitoring and observation of the specific zone on fire. Step 112 is the continued monitoring of the fire in that specific zone, and potentially the spread of the fire to different zones similar to step 109 as discussed above. The final step in the behavioral fire spread is step 113 which is continued monitoring of the specific zones until the PLC has determined that the trainees have done enough to extinguish the fire, and then the PLC will end the fire.

In one or more embodiments, a pre-selected fire spread is defined as a fire pattern that will spread according to a pre-selected pattern; the fire pattern is not random; and although the fire will eventually be put out based on how the trainees using the fire training system 10 fight the fire, the fire does not spread based on those actions of the trainees. If the operator chooses to have the fire training session operate with a pre-selected fire spread 106, then the next step in the process will be to have specific zone(s) ignited based on which pre-selected fire spread pattern is selected at step 114. At step 115, the multiple thermal imaging devices 12 will monitor the specific zones that should have been ignited at step 114 to make sure that a fire has been started. If the multiple thermal imaging devices 12 have proven that a fire has been started, the PLC considers the fire proven at step 116 and will continue to monitor the status of the fires in the specific zone(s).

The PLC will be able to take the temperature information collected by the multiple thermal imaging devices 12 and will be able to determine if the trainees have done enough to the fire to properly extinguish the fire within the specific zone(s) being monitored, and if the trainees have done enough, then the PLC continues to step 117 which will be the ending of the fire within that specific zone(s). In one or more embodiments, the fire is ended by valve 74 located within that specific zone(s) being closed so as to stop the delivery of propane gas. However, if the PLC has determined that the trainees have not done enough to the fire to properly extinguish the fire within the specific zone, then the PLC will move to step 118, which is the continued burning of the fire in that specific zone(s) until the trainees have done enough to the fire to properly extinguish the fire, and then the PLC will extinguish the fire.

In light of the foregoing, it should be appreciated that the present invention significantly advances the art by providing a fire training method and system that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A method of training firefighters, comprising the steps of:
   a. forming a system for the training of firefighters comprising:
      i. a burn area disposed in a pit structure;
      ii. a multitude of individual burn zones located within the burn area and wherein each individual burn zone can support a fire there within;
      iii. a control system to control the fire in each individual burn zone; and
      iv. a multitude of thermal imaging devices positioned to monitor the multitude of individual burn zones and to report the temperature of each individual burn zone to the control system;
   b. directing the control system to start a fire within at least one of the multitude of individual burn zones;
   c. allowing the firefighters to begin fighting the fire; and
   d. monitoring the fire using the multitude of thermal imaging devices to determine, based on the temperature imaging of the fire, if the fire has been properly extinguished.

2. The method of claim 1, wherein the fire is spread in a pre-selected manner.

3. The method of claim 2, wherein the thermal imaging devices monitor and report the spread of the fire in real time.

4. The method of claim 3, wherein the fire continues until proper extinguishing techniques are determined to have been employed, at which time the fire is extinguished.

5. The method of claim 1, wherein the fire is spread in response to the activities of the firefighters in fighting the fire.

6. The method of claim 5, wherein the fire is caused to die down and extinguish when the firefighters employ proper extinguishing techniques and to spread in response to improper techniques.

7. The method of claim 6, wherein the thermal imaging devices monitor and report where proper extinguishing techniques are employed and where improper techniques are employed, and the control system extinguishes the fire where proper techniques are employed and causes the fire to spread where improper techniques are employed and in response to the nature of such improper techniques.

8. The method of claim 1, further comprising monitoring and assessing temperature gradients within a burn zone, correlating those gradients with firefighter activities and changing the fire location in response thereto.

9. The method of claim 8, further comprising changing the fire intensity as a function of the temperature gradients.

\* \* \* \* \*